United States Patent [19]
Stephens et al.

[11] 3,920,819
[45] Nov. 18, 1975

[54] NONAQUEOUS VEHICLE FOR ORAL PHARMACEUTICAL SUSPENSIONS
[75] Inventors: Verlin C. Stephens; Kenneth S. E. Su, both of Indianapolis, Ind.
[73] Assignee: Eli Lilly and Company, Indianapolis, Ind.
[22] Filed: Dec. 2, 1974
[21] Appl. No.: 528,608

[52] U.S. Cl. ............... 424/246; 424/181; 424/227; 424/361; 424/365
[51] Int. Cl.² .............. A61K 31/545; A61K 31/65; A61 K 31/71; A61K 47/00
[58] Field of Search ........... 424/365, 361, 246, 181, 424/227

[56] References Cited
UNITED STATES PATENTS
2,867,565   1/1959   Feinstone............................ 424/365

Primary Examiner—Sam Rosen
Attorney, Agent, or Firm—Ralph W. Ernsberger; Everet F. Smith

[57] ABSTRACT

A nonaqueous vehicle for oral pharmaceutical suspensions is described which has a satisfactory taste, low toxicity, good flow properties and is highly resistant to settling and caking of the suspended material. Such a vehicle is comprised principally of refined fractionated coconut oil, hydrogenated castor oil, lecithin, aluminum stearate and an oil isoluble excipient such as sucrose. This nonaqueous vehicle is useful for preparing ready-to-use oral pharmaceutical suspension of water degradable physiologically active agents.

10 Claims, No Drawings

NONAQUEOUS VEHICLE FOR ORAL PHARMACEUTICAL SUSPENSIONS

BACKGROUND OF THE INVENTION

1. Field of the Invention

This invention relates to an oral pharmaceutical dosage form. More particularly, this invention concerns a nonaqueous vehicle into which there can be dispersed certain water degradable physiologically active agents to provide an oral liquid dosage form in which such agent is stable for an extended period at room temperature.

2. Prior Art

Oral pharmaceutical suspensions have been known and used for a long time. Primarily this dosage form has been favored by the very young and the elderly people who find it difficult to swallow tablets or capsules.

Oral pharmaceutical suspensions are comprised of a physiologically active agent or agents and a vehicle. The vehicle is generally comprised of a liquid, density and viscosity adjusting substances, flavoring agents and preservatives. Water has usually been the preferred liquid. The physiologically active agent is present as a dispersed material, the particle size of which is very small, preferably as an impalpable powder. The solubility of the active agent in the liquid is very low.

The oral pharmaceutical suspension is contrasted with the oral pharmaceutical solution in which the physiologically active agent is soluble in the liquid, and chemically stable therein.

In many cases, the physiologically active agent is not chemically stable in either a water-based oral pharmaceutical suspension or an oral pharmaceutical solution. When such a case exists it is not possible to prepare a satisfactory liquid pharmaceutical dosage form utilizing water as the base for the preparation. Oil based oral pharmaceutical suspension have been sold heretofore in many countries. But in most cases such suspensions have exhibited an oily taste and have not been held in very high esteem because of this characteristic. Consequently, such suspensions have not had great success in the market place.

Accordingly, it is an object of this invention to provide a nonaqueous vehicle for an oral pharmaceutical suspension in which water degradable physiological active agents can be dispersed and remain chemically stable therein, and which, in addition, does not taste oily and has a good mouth feel.

Another object of this invention is to provide a nonaqueous vehicle for an oral pharmaceutical suspension which will have a low toxicity, good flow properties and be resistant to the settling and caking of the pharmaceutically active agent dispersed therein.

SUMMARY

Now it has been discovered that a refined fractionated coconut oil with which is combined hydrogenated castor oil, lecithin, aluminum stearate, and an insoluble excipient or combination of excipients selected from the group consisting of dextrose, fructose, glucose, lactose, maltose, mannitol and sucrose in amounts adapted to adjusting the viscosity and density of the vehicle to the inherent density of the particles to be suspended therein, provides an eminently satisfactory nonaqueous vehicle for oral pharmaceutical suspensions of water degradable physiologically active agents.

DESCRIPTION OF THE PREFERRED EMBODIMENTS

One aspect of this invention relates to a novel nonaqueous vehicle for use in preparing an oral pharmaceutical suspension of a physiologically active agent. Preferably, this vehicle is used with a water degradable agent. This novel vehicle is comprised of: (a) refined fractionated coconut oil; (b) hydrogenated castor oil; (c) lecithin; (d) aluminum stearate; and (e) an oil insoluble excipient or combination of excipients selected from the group consisting of dextrose, fructose, glucose, maltose, mannitol, and sucrose.

The refined fractionated coconut oil is a clear yellow mixture of triglycerides containing only esters of short- and-medium chain saturated fatty acids, mainly octanoic and decanoic acids which have been reconstituted to produce an alcohol soluble oil. It has a specific gravity of not less than 0.93 and not more than 0.95 at 25°C. The iodine value is not more than 2 and the saponification value not less than 335 and not more than 360, both being determined by the appropriate U.S.P. tests.

Hydrogenated castor oil is a white to off-white powder and has an iodine value of not more than 6. Its saponification value is not less than 165 and not more than 185, and its acid value is not more than 4. All values are determined by U.S.P. tests.

Aluminum stearate is a commercially available substance that is believed to be composed of about equal parts by weight of aluminum monostearate and aluminum distearate.

The lecithin and saccharides are common substances, well known to those skilled in the art.

The novel nonaqueous vehicle of the instant invention can contain from about 0.7 to about 2.6 percent (W/V) of aluminum stearate; from about 0.2 to about 0.8 percent (W/V) of hydrogenated castor oil; from about 0.6 to about 0.8 percent (W/V) of lecithin; from about 24 to about 40 percent (W/V) of the insoluble excipient or combination thereof; and from about 50 to about 85 percent (V/V) of refined fractionated coconut oil.

One particularly preferred vehicle is comprised of about 1.0 percent (W/V) of aluminum stearate, about 0.35 percent (W/V) of hydrogenated castor oil, about 0.7 percent (W/V) of lecithin, about 30 percent (W/V) of sucrose (U.S.P.), and about 78 percent (V/V) of refined fractionated coconut oil.

Whereas, at first impression, it would appear that the saccharide employed as an insoluble excipient is present in the vehicle solely as a flavoring agent, but such is not the case; the saccharide insoluble excipient does more than sweeten the vehicle to the taste, it also aids significantly in overcoming the oily taste and mouth feel. It also is a useful adjunct to retard the settling and caking of the physiologically active agent to be suspended in the vehicle. The apparent explanation is that a possible syrup-like structure was achieved in the system. It is also suggested that because of the large difference in the dielectric constant of aqueous vehicles and lipophilic vehicles, the loading of the lipophilic vehicle with the insoluble saccharide excipient changes the zeta potential and contributes to a physically more stable dispersion.

Illustrative of physiologically active agents which can be incorporated into the useful vehicle of this invention are antibiotics, such as erythromycin, penicillin-V, tetracycline, cephalexin, cephlaglycine, and others.

When the novel vehicle of this invention is employed as the carrier for one of the physiologically active agents named above, or other medicinals, the composition of such vehicle is adjusted within the range for each component as described hereinbefore to accommodate the variety of specific densities to be found among such agents. The physiologically active agent is ground on a hammer mill to a particle size range where 100 percent of the particles will pass a 100 U.S. mesh screen.

Example 1 describes the procedure for preparing the useful vehicle herein described. The quantities of each component employed are typical amounts and such can be varied within the ranges hereinbefore detailed as operative for each ingredient without violating the spirit of this invention.

EXAMPLE 1

Preparation of a Vehicle for a Nonaqueous Oral Pharmaceutical Suspension

To make one liter of vehicle, employ the formula and process of preparation that follows:

| | | |
|---|---|---|
| Add: | Place in a suitable vessel - Fractionated Coconut Oil Heat to 90–100°C. | 700 ml |
| Add: | Lecithin, refined grade | 7.0 g |
| Add: | Aluminum Stearate | 10.0 g |
| Add: | Castor Oil hydrogenated Mix thoroughly to suspend | 3.5 g |
| Add: | Sucrose, powdered 200 mesh Mix thoroughly to suspend Cool to room temperature | 300.0 g |
| Add: | Fractionated Coconut Oil, q.s. | 1.0 l |

To the above vehicle can be added a perservative such as butylparaben; oil soluble dyes or lakes; such as FD and C yellow No. 5 aluminum lake, and flavoring agents such as sodium chloride and oil soluble imitation fruit flavors.

In another aspect of the instant invention a highly regarded oral pharmaceutical suspension of cephalexin can be prepared utilizing the vehicle described hereinbefore and combining therewith an appropriate preservative and flavoring agents. Such a suspension has outstanding chemical stability, assays for cephalexin showing no significant degradation after 24 months at room temperature storage.

The taste and mouth feel was pronounced good, better than acceptable, by a volunteer panel of 100 children; comparable to aqueous vehicles.

The novel oral pharmaceutical suspension of cephalexin of this invention is comprised of from about 2.5 percent to about 10 percent (W/V) of cephalexin monohydrate, from about 0.7 to about 2.6 percent (W/V) of aluminum stearate, from about 0.2 to about 0.8 percent (W/V) castor oil hydrogenated, from about 0.2 to about 0.8 percent (W/V) lecithin refined grade, from about 50 to about 80 percent (V/V) refined fractionated coconut oil and from about 28.0 to about 40.0 percent (W/V) of an oil insoluble excipient selected from the group consisting of dextrose, fructose, glucose, maltose, mannitol and sucrose. On the insoluble excipients, sucrose is preferred, and whichever of these is employed it shall be of a mesh size (U.S. screen) below 200.

A preferred composition of an oral pharmaceutical suspension of cephalexin is comprised of about 5.5 percent (W/V) cephalexin monohydrate, about 1.0 percent (W/V) aluminum stearate, about 0.35 percent (W/V) castor oil hydrogenated, about 0.7 percent (W/V) lecithin refined grade, about 30.0 percent (W/V) sucrose, and about 74 percent (V/V) fractionated coconut oil.

About 0.04 percent (W/V) of butyparaben (U.S.P.) can be added to the above described cephalexin suspension as a preservative. Sodium chloride in the amount of about 0.05 percent (W/V) and an imitation fruit flavor in the amount of about 0.5 percent (V/V) can be incorporated into the suspension to provide an appealing flavor. And, if desired, a coloring agent or agents such as FD and C yellow Nos. 5 and 6 aluminum lakes in amounts of about 0.15 to about 0.2 percent (W/V) can also be added to such a suspension to add pharmaceutical elegance to the preparation.

The preferred oral pharmaceutical suspension of cephalexin is prepared by dissolving the lecithin refined grade and the butylparaben in a portion of the fractionated coconut oil. The solution is made easier by heating the fractionated coconut oil to about 90°–100°C., and agitating the mixture thoroughly until all of the solids are dissolved. To this solution, with the heat maintained, are added the aluminum stearate and castor oil hydrogenated and the resulting mixture is mixed well until the latter two ingredients are thoroughly dispersed. Then the sucrose and the sodium chloride [previously powdered to a −200 mesh (U.S. screen) particle size] are added and the resulting dispersion is mixed thoroughly with the temperature at 90°–100°C. for 2 to 3 hours.

The resulting dispersion is cooled to room temperature with mixing. After the dispersion reaches room temperature the colors (dyes), if any, are added and thoroughly dispersed with vigorous agitation. Next the imitation fruit flavor is added to the dispersion followed by the finely divided cephalexin monohydrate [all − 100 mesh (U.S. screen) particles], which is added slowly with vigorous agitation until the dispersion is uniform. Then the remainder of the fractionated coconut oil is added to bring the suspension up to volume.

The resulting dispersion is homogenized or run through a suitable mill, such as a Charlotte or Homaloid mill. Following homogenation, the suspension is once more mixed thoroughly before packaging.

The preparation of an oral pharmaceutical suspension of cephalexin is more specifically detailed in Example 2.

EXAMPLE 2

Preparation of a 1000 Liters Oral Pharmaceutical Suspension Containing 250 mg. of Cephalexin (as cephalexin monohydrate) per 5 ml of Suspension

| | | |
|---|---|---|
| | Place in a suitable vessel equipped with means for agitation and heating - Fractionated Castor Oil | 700.0 l |
| Add: | Lecithin refined grade | 7.0 kg |
| Add: | Butylparaben (USP) Heat to 90–100°C and agitate vigorously to dissolve | 0.4 kg |
| Add: | Aluminum Stearate | 10.0 kg |
| Add: | Castor Oil Hydrogenated Agitate vigorously Continue heating at 90–100°C. Mix until thoroughly dispersed. | 3.5 kg |
| Add: | Sucrose, 200 mesh powdered (USP) | 300.0 kg |
| Add: | Sodium Chloride, powdered (USP) Agitate vigorously for 2–3 hours. Continue heating at 90–100°C | 0.5 kg |

-continued

| Add: | Cool to room temperature with continued mixing and | |
|---|---|---|
| Add: | FD & C Yellow No. 5 Aluminum Lake | 0.6 kg |
| Add: | FD & C Yellow No. 6 Aluminum Lake Continue mixing, and | 1.0 kg |
| Add: | Imitation Guarana Liquid 51.880/A (Firmenich) Continue mixing, and | 5.0 l |
| Add: | Cephalexin Monohydrate Continue mixing until thoroughly dispersed, and | 55.85 kg |
| Add: | Fractionated Coconut Oil, q.s. Put dispersion through a Homoloid Mill Package. | 1000.0 l |

What is claimed is:

1. A nonaqueous vehicle for use in an oral pharmaceutical suspension comprised of: (a) refined fractionated coconut oil having a saponification value not less than 335 and not more than 360, (b) hydrogenated castor oil having an iodine number below 6, (c) lecithin refined grade, (d) aluminum stearate, and (e) an oil insoluble excipient or combination of excipients selected from the group consisting of dextrose, fructose, glucose, maltose, mannitol and sucrose.

2. The vehicle of claim 1 wherein said oil insoluble excipient is sucrose.

3. The vehicle of claim 1 wherein said vehicle is comprised of from about 0.7 to about 2.6 percent (W/V) of the aluminum stearate, from about 0.2 to about 0.8 percent (W/V) of the hydrogenated castor oil, from about 0.6 to 0.8 percent (W/V) of the lecithin refined grade, from about 24 to about 40 percent (W/V) of the oil insoluble excipient selected from the group consisting of dextrose, fructose, glucose, maltose, mannitol, sorbitol and sucrose, and from about 50 to about 85 percent (V/V) of refined fractionated coconut oil.

4. The vehicle of claim 3 wherein said oil insoluble excipient is sucrose.

5. A nonaqueous oral pharmaceutical suspension comprised of: (a) an oil insoluble physiologically active agent, (b) refined fractionated coconut oil having a saponification value of not less than 335 and not more than 360, (c) hydrogenated castor oil having an iodine number below 6, (d) lecithin refined grade, (e) aluminum stearate, and (f) an oil insoluble excipient selected from the group consisting of dextrose, fructose, glucose, maltose, mannitol, sorbitol and sucrose.

6. The nonaqueous oral pharmaceutical suspension of claim 5 wherein said oil insoluble excipient is sucrose.

7. The nonaqueous oral pharmaceutical suspension of claim 6 comprised of (a) from about 2.5 to about 10.0 percent (W/V) of said physiologically active agent, (b) from about 0.7 to about 2.6 percent (W/V) of the aluminum stearate, (c) from about 0.2 to about 0.8 percent (W/V) of the hydrogenated castor oil, (d) from about 0.2 to about 0.8 percent (W/V) of the lecithin refined grade, (e) from about 28.0 to about 40.0 percent (W/V) of the oil insoluble excipient selected from the group consisting of dextrose, fructose, glucose, maltose, mannitol and sucrose, and (f) from about 50 to about 80 percent (V/V) of the refined fractionated coconut oil.

8. The nonaqueous pharmaceutical suspension of claim 7 wherein said oil insoluble excipient is sucrose.

9. The nonaqueous pharmaceutical suspension of claim 7 wherein said physiologically active agent is cephalexin monohydrate.

10. A nonaqueous oral pharmaceutical suspension comprised of: (a) about 5.5 percent (W/V) of cephalexin monohydrate, (b) about 1.0 percent (W/V) of aluminum stearate, (c) about 0.7 percent (W/V) of lecithin refined grade, (d) about 0.35 percent of castor oil hydrogenated having an iodine number of less than 6, (e) about 30.0 percent (W/V) of sucrose, and (f) about 74.0 percent (V/V) of refined fractionated coconut oil having a saponification value of not less than 335 and not more than 360.

* * * * *